United States Patent [19]

DeLine

[11] Patent Number: 5,062,460
[45] Date of Patent: Nov. 5, 1991

[54] ROUTER AND GUIDE APPARATUS

[76] Inventor: Steven K. DeLine, 626 W. Catawba Ave., Mt. Holly, N.C. 28120

[21] Appl. No.: 663,681

[22] Filed: Mar. 4, 1991

[51] Int. Cl.$^5$ .............................................. B27C 5/00
[52] U.S. Cl. ................................. 144/136 C; 30/375; 30/391; 144/134 D
[58] Field of Search ................. 83/745; 30/375, 376, 30/391; 33/41.1; 409/182; 144/134 D, 136 C

[56] References Cited

U.S. PATENT DOCUMENTS 4,921,023 5/1990 Pempek ........................... 144/136 C

FOREIGN PATENT DOCUMENTS 1090843 10/1960 Fed. Rep. of Germany ... 144/136 C

Primary Examiner—W. Donald Bray
Attorney, Agent, or Firm—Leon Gilden

[57] ABSTRACT

An apparatus wherein a router assembly is mounted to a top surface of a transparent plate utilizing a forward "V" notch to guide the router and direct the router along a predetermined lineal dimension, wherein a handle is mounted longitudinally aligned relative to the transparent plate rearwardly of the router assembly, wherein the handle mounts a guide plate to a bottom surface of the transparent base plate, wherein the guide plate is defined by a predetermined width substantially equal to a predetermined diameter of a router and associated bore directed through the transparent plate.

4 Claims, 4 Drawing Sheets

ROUTER AND GUIDE APPARATUS

BACKGROUND OF THE INVENTION

1. Field of the Invention

The field of invention relates to router and guide structure, and more particularly pertains to a new and improved router and guide apparatus wherein the same utilizes a guide plate mounted to a bottom surface of a transparent plate for guiding a router along a lineal dimension.

2. Description of the Prior Art

Router and guide structure of various types have been utilized extensively throughout the prior art to provide guidance of routers and their use in wood working procedures. Such apparatus may be found for example in U.S. Pat. No. 4,825,920 to Evitts wherein a router structure utilizes a slotted guide plate mounted to a support base for mounting a router thereto.

U.S. Pat. No. 3,985,168 to Lundquist sets forth an adjustable router table of rectangular configuration, wherein each of the legs are adjustable relative to one another.

U.S. Pat. No. 4,630,657 to Obradovich sets forth a router guide structure utilizing opposed clamping members to secure a workpiece and router structure therebetween.

U.S. Pat. No. 4,552,193 to Armas sets forth a door frame shaper mounting a router thereto in a guide orientation for shaping door frames in predetermined patterns.

As such, it may be appreciated that there continues to be a need for a new and improved router and guide apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of router guide apparatus now present in the prior art, the present invention provides a router and guide apparatus wherein the same mounts a router orthogonally through a transparent plate utilizing a rearwardly positioned handle to guide the router along a predetermined lineal dimension. As such, the general purpose of the present invention, which will be described subsequently in greater detail, is to provide a new and improved router and guide apparatus which has all the advantages of the prior art router and guide apparatus and none of the disadvantages.

To attain this, the present invention provides an apparatus wherein a router assembly is mounted to a top surface of a transparent plate utilizing a forward "V" notch to guide the router and direct the router along a predetermined lineal dimension, wherein a handle is mounted longitudinally aligned relative to the transparent plate rearwardly of the router assembly, wherein the handle mounts a guide plate to a bottom surface of the transparent base plate, wherein the guide plate is defined by a predetermined width substantially equal to a predetermined diameter of a router and associated bore directed through the transparent plate.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved router and guide apparatus which has all the advantages of the prior art router and guide apparatus and none of the disadvantages.

It is another object of the present invention to provide a new and improved router and guide apparatus which may be easily and efficiently manufactured and marketed.

It is a further object of the present invention to provide a new and improved router and guide apparatus which is of a durable and reliable construction.

An even further object of the present invention is to provide a new and improved router and guide apparatus which is susceptible of a low cost of manufacture with regard to both materials and labor, and which accordingly is then susceptible of low prices of sale to the consuming public, thereby making such router and guide apparatus economically available to the buying public.

Still yet another object of the present invention is to provide a new and improved router and guide apparatus which provides in the apparatuses and methods of the prior art some of the advantages thereof, while simultaneously overcoming some of the disadvantages normally associated therewith.

Still another object of the present invention is to provide a new and improved router and guide apparatus wherein the same mounts a router orthogonally through a transparent plate to permit guidance of the router along a lineal dimension.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
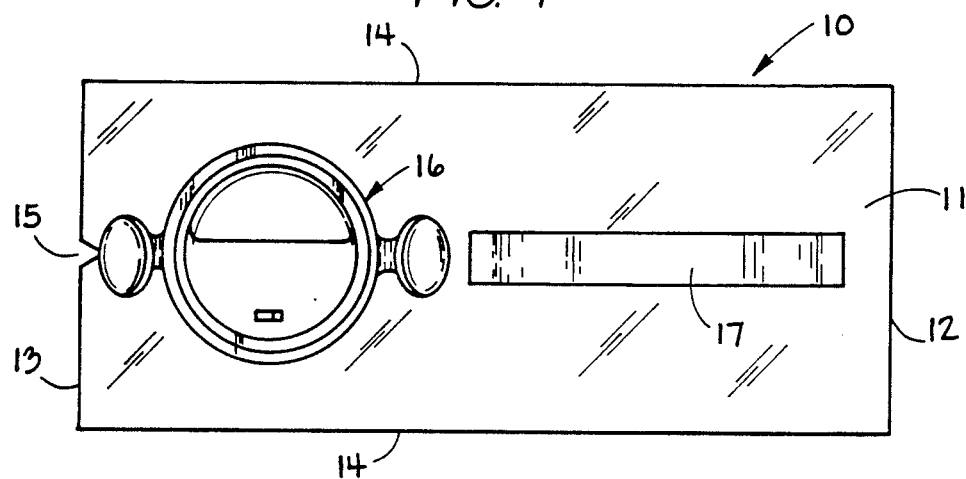
FIG. 1 is an orthographic top view of the instant invention.
Figure 2:
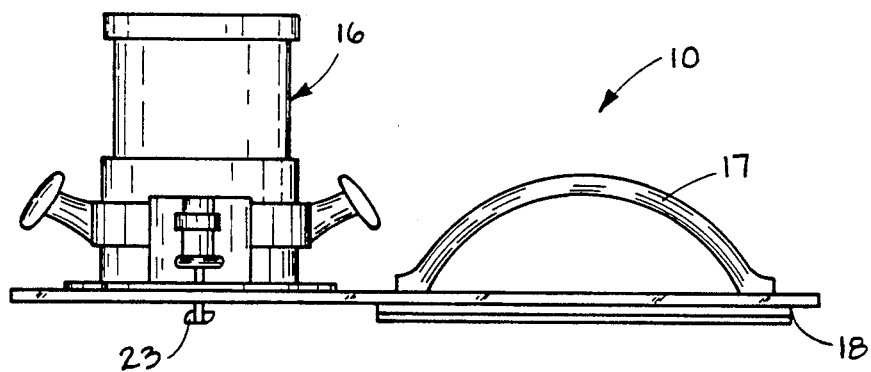
FIG. 2 is an orthographic side view of the instant invention.
Figure 3:
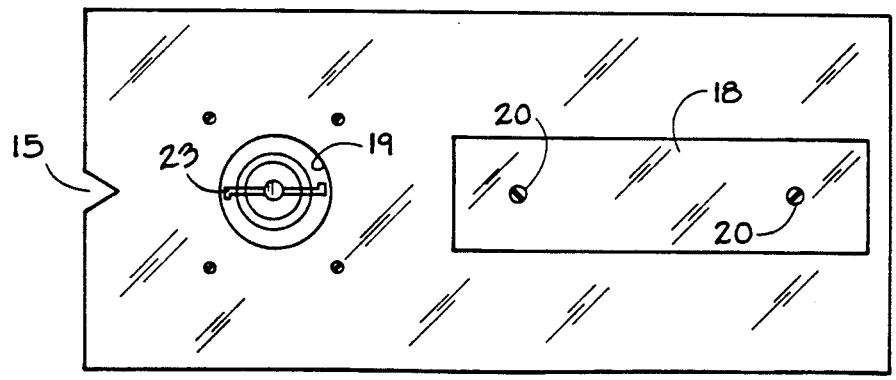
FIG. 3 is an orthographic bottom view of the instant invention.
Figure 4:
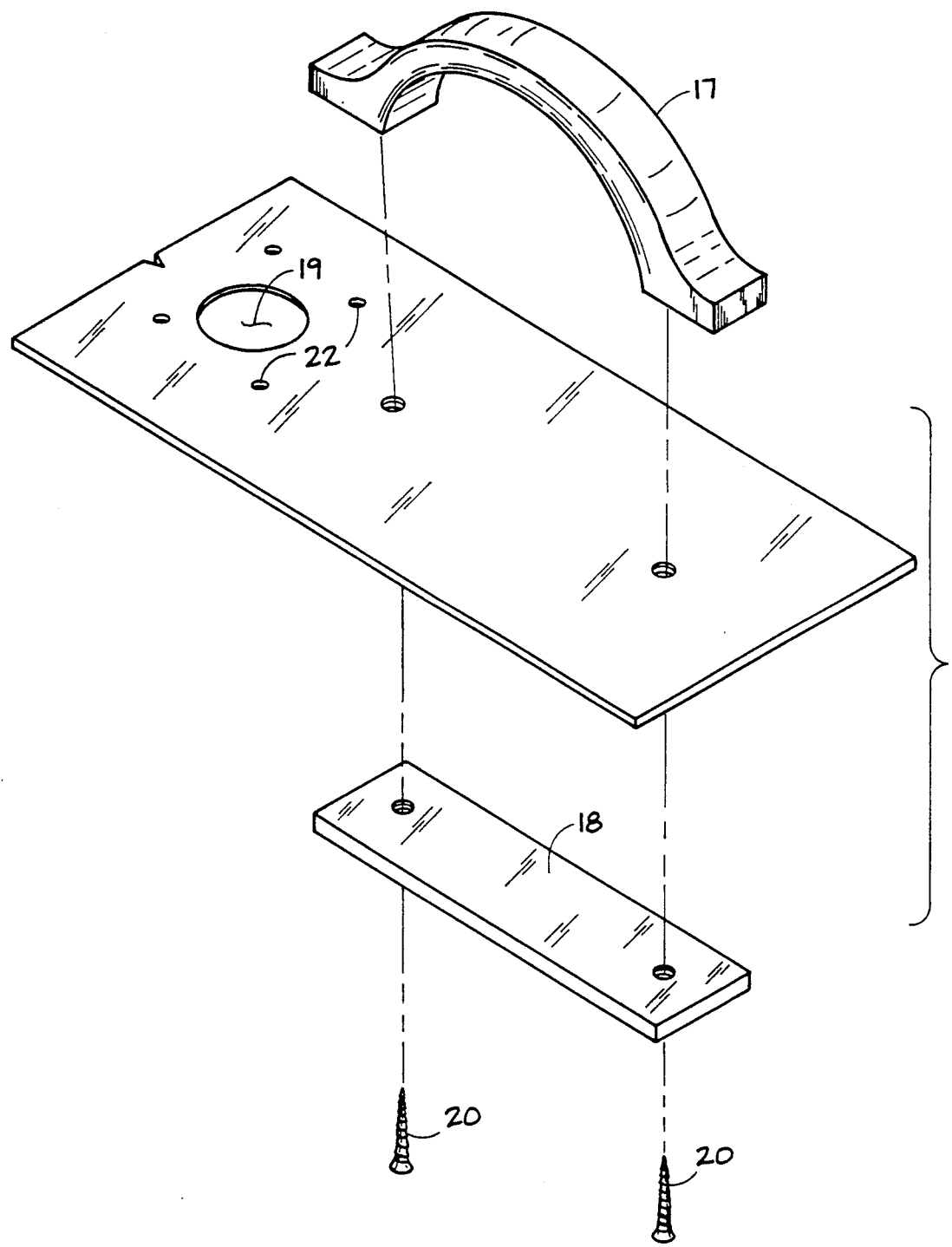
FIG. 4 is an isometric exploded illustration of the instant invention.
Figure 5:
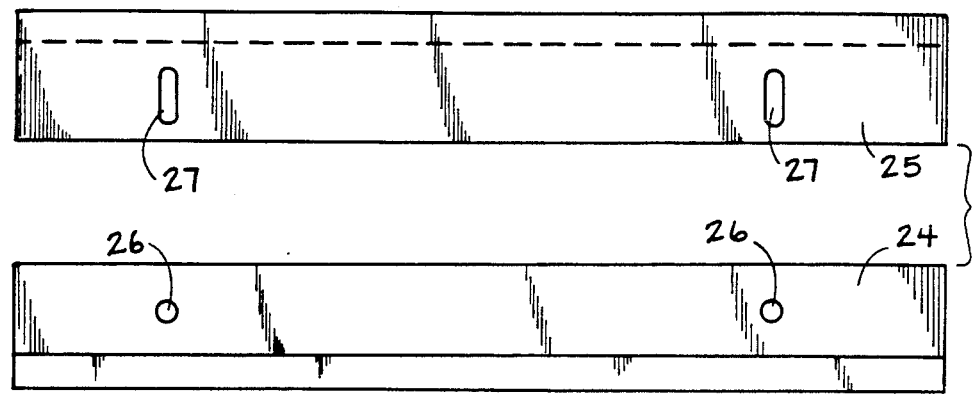
FIG. 5 is an orthographic top view of adjustable router guide plates utilized by the instant invention.
Figure 6:
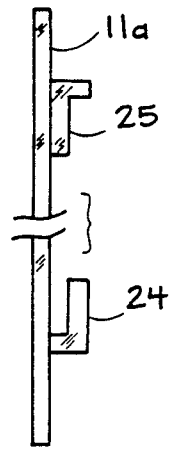
FIG. 6 is an orthographic end view of the router adjustable guide plates utilized by the instant invention.
Figure 7:
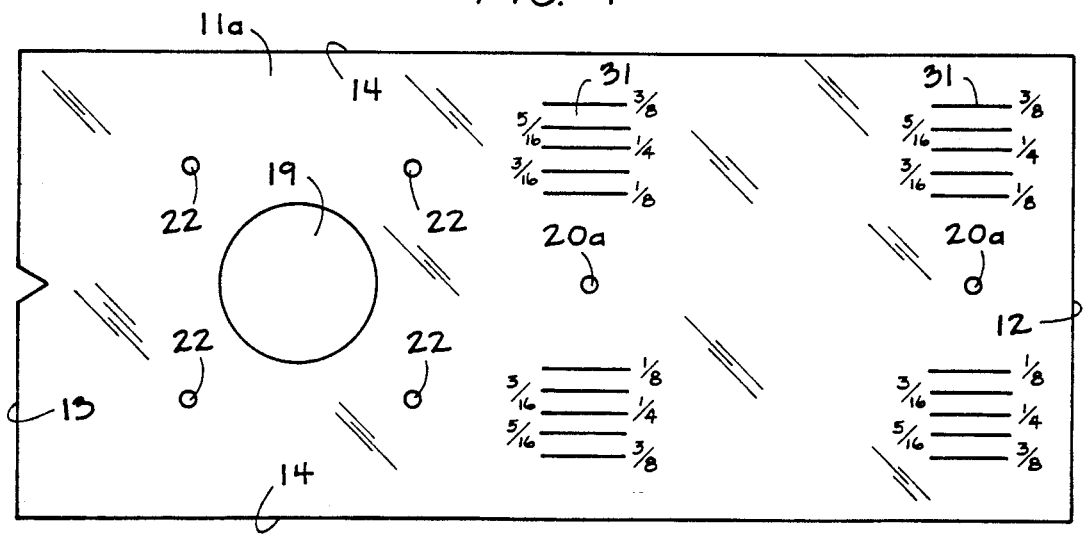
FIG. 7 is an orthographic top view of a modified transparent plate structure utilized by the instant invention.
Figure 8:
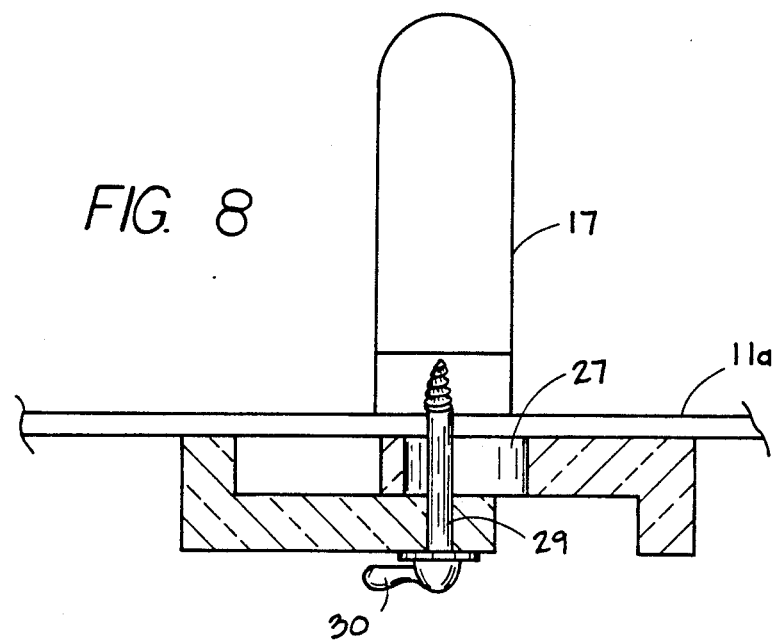
FIG. 8 is an orthographic end view of the plates mounted to the modified transparent plate.
Figure 9:
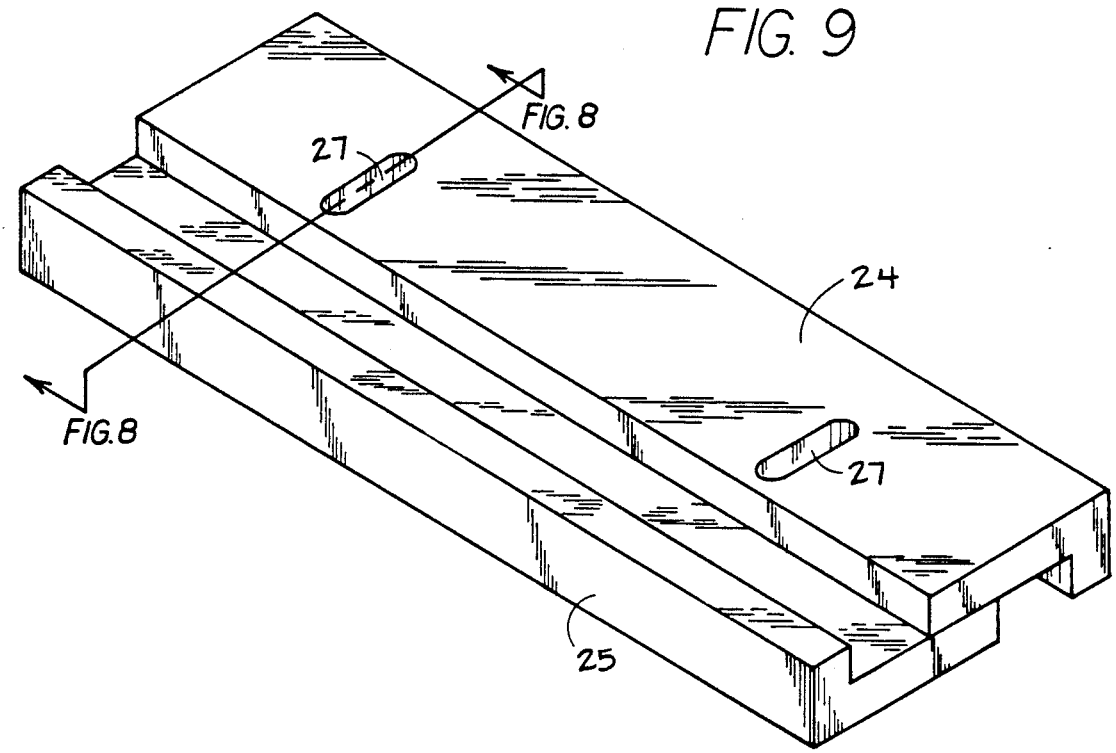
FIG. 9 is an isometric illustration of the adjustable guide plates utilized by the router and guide apparatus of the instant invention.

With reference now to the drawings, and in particular to FIGS. 1 to 9 thereof, a new and improved router and guide apparatus embodying the principles and concepts of the present invention and generally designated by the reference numerals 10 and 10a will be described.

More specifically, the router and guide apparatus 10 of the instant invention essentially comprises a transparent base plate 11 of a generally rectangular configuration, including a rear edge 12, a forward edge 13, and spaced parallel side edges 14. A "V" notch guide 15 is directed medially through the forward edge 13 radially aligned with a router bit bore 19 mounting a router assembly 16 thereover. The router assembly 16 includes a router bit 23 directed through the router bit bore 19 positioned to underlie a bottom surface of the transparent base plate 11. The base plate 11 is formed of a transparent preferably polymeric material to permit visual observation of a workpiece positioned under the transparent base plate 11 in use. A handle 17 is positioned medially between the side edges 14 and longitudinally aligned relative to the transparent base plate 11 and mounts a guide plate 18 coextensively with the handle 17 to the bottom surface of the base plate 11. A plurality of handle fasteners 20 directed through the guide plate 11 secure the guide plate 18, the transparent base plate 11, and the handle 17 together in a fixed integral relationship. Router mounting bores 22 are positioned in surrounding relationship relative to the router bit bore 19 for mounting of the router assembly 16 to the top surface of the transparent base plate 11.

FIGS. 5-9 illustrate the use of a modified apparatus 10a, including a modified transparent base plate 11 utilizing a plurality of reference lines 31 at predetermined increments to each side of the handle mounting bores 20a. The modified apparatus 10a utilizes a respective first and second "L" shaped adjustable guide plate 24 and 25 respectively that are slidably mounted relative to one another to accommodate lateral offset of each of the guide plates relative to the transparent base plate 11 and the router bit 23 effecting different and varying patterns upon a workpiece (not shown). The first guide plate 24 includes a first guide plate horizontal leg slidably receiving a second guide plate horizontal leg between the first guide plate horizontal leg and a bottom surface of the transparent base plate 11a. First guide plate bores 26 are directed through the first guide plate horizontal legs cooperative with second guide plate slots 27 directed through the second guide plate horizontal legs, wherein the bores and slots 26 and 27 respectively each receive a fastener 29 therethrough, with each fastener 29 mounting a handle 30 to permit rapid loosening and tightening of the first guide plate horizontal leg relative to the second guide plate horizontal leg to effect lateral repositioning of the vertical legs of each of the respective first and second guide plates 24 and 25 relative to one another to provide abutment surfaces at various distances from the associated router bit 23.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A router and guide apparatus comprising, in combination, a transparent base plate, the transparent base plate formed of a rectangular configuration including a rear edge, a forward edge, and spaced parallel side edges, and a "V" notch guide positioned medially of the forward edge, and a router bit bore defined by a predetermined diameter directed through the transparent base plate adjacent the forward edge, with the "V" notch guide radially aligned with the router bit bore, and a router assembly orthogonally mounted to a top surface of the transparent base plate, wherein the router assembly includes a router bit coaxially directed through the router bit bore projecting underlying a bottom surface of the transparent base plate, and a handle positioned medially of and longitudinally aligned relative to the transparent base plate and radially aligned with the router bit bore and the "V" notch guide.

2. An apparatus as set forth in claim 1 including a guide plate coextensively and longitudinally mounted relative to the handle mounted to the bottom surface of the transparent base plate, and a plurality of fasteners directed through the guide plate to secure the handle, the transparent base plate, and the guide plate together.

3. An apparatus as set forth in claim 2 wherein the handle is orthogonally mounted relative to the top surface of the transparent base plate.

4. An apparatus as set forth in claim 3 wherein the guide plate includes an "L" shaped adjustable first guide plate adjustably mounted to the bottom surface of the transparent base plate and to an "L" shaped second guide plate, the "L" shaped first guide plate including a first guide plate horizontal leg and the second guide plate including a second guide plate horizontal leg, wherein the second guide plate horizontal leg is mounted between the transparent base plate and the first guide plate horizontal leg, and the first guide plate horizontal leg including a plurality of first guide plate bores directed therethrough, and the second guide plate horizontal leg including a plurality of second guide plate slots directed therethrough, wherein the bores and slots are aligned relative to one another, and a fastener directed through a respective bore and slot of the first guide plate bores and the second guide plate slots to adjustably secure the first guide plate and the second guide plate to the handle.

* * * * *